T. FOSTER.
VARIABLE GEAR.
APPLICATION FILED SEPT. 25, 1912.
1,079,044.
Patented Nov. 18, 1913.
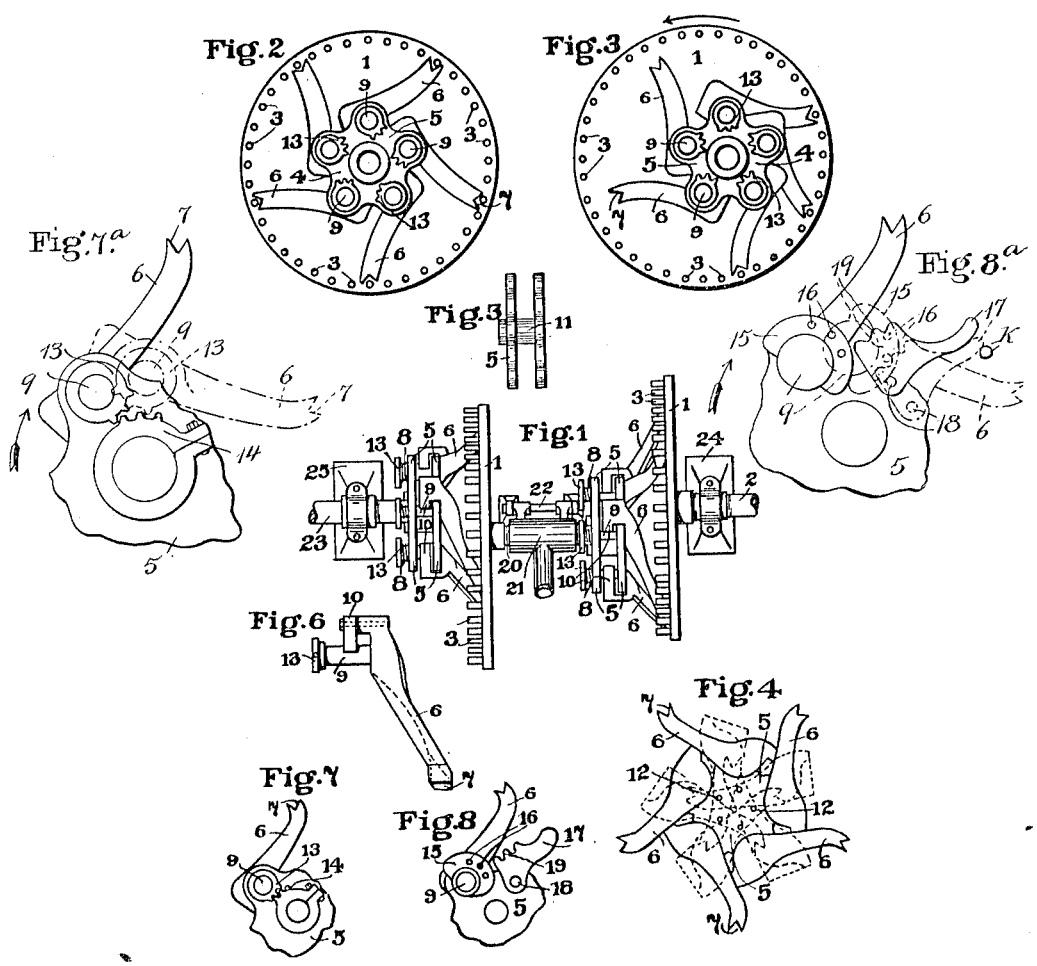

UNITED STATES PATENT OFFICE.

THOMAS FOSTER, OF CHRISTCHURCH, NEW ZEALAND.

VARIABLE GEAR.

1,079,044.

Specification of Letters Patent. Patented Nov. 18, 1913.

Application filed September 25, 1912. Serial No. 722,199.

*To all whom it may concern:*

Be it known that I, THOMAS FOSTER, a subject of the King of Great Britain, residing at 134 Hereford street, Christchurch, in the Dominion of New Zealand, have invented new and useful Improvements in Variable Gears, of which the following is a specification.

This invention relates to adjustable gearing for use in varying the speed of rotation between a driving shaft and the load and refers to that type in which the teeth of an internal wheel are engaged by a plurality of tangentially disposed arms pivoted around a boss or hub, the arrangement being such that an interaction of the arms and teeth will occur both when the centers of the axles of the boss and wheel are in coincidence and when in eccentric relation to each other, thus providing virtually a gear train in which the diameter of the pinion is capable of variation.

The object of the present invention is to provide a construction whereby a great range of speed either above or below that of the driving shaft may be obtained, a further object being to reduce noise and friction among the working parts thus rendering the device suitable for general purposes.

With these and other objects in view the invention consists in the novel and peculiar construction, arrangement and combination of parts as hereinafter described and illustrated in the accompanying sheet of drawings in which:—

Figure 1 is a diagrammatic plan view of the device in assembly, the centers of the wheels and pinions being shown in eccentric relation to each other. Fig. 2 is a detail view of one of the wheels with its pinion in concentric relation. Fig. 3 is a similar view to Fig. 2, but showing the wheel and pinion eccentrically disposed to each other. Fig. 4 is a face view of the pinion, the arms being shown in their outward position in full lines and in their nested position in dotted lines, Fig. 5 is a detail view of the boss of the pinion upon which the arms are mounted, Fig. 6 is a detail view of one of the arms of the pinion showing its peculiar formation and the means for mounting it upon the boss, Fig. 7 shows the means employed for controlling the arms so as to prevent their engaging the wheel prematurely when the device is employed as a reduction gear, Fig. 7ª is a view similar to Fig. 7 showing the parts in different positions. Fig. 8 shows an alternative construction for that of Fig. 7. Fig. 8ª is a view similar to Fig. 8 showing the parts in different positions.

1 is an internal gear-wheel consisting of a disk mounted upon a suitable axle 2 and provided around one of its side faces with a concentric arrangement of equidistantly spaced pins or projections 3 constituting the teeth of the wheel. If thought necessary in order to increase the strength, the said teeth may be suitably shrouded. Arranged so as to face the toothed side of the said wheel 1 and carried upon a second axle parallel with the axle of the wheel, is a pinion, 4, comprising a boss 5 upon which are pivoted so as to be capable of turning at right angles with the axle of the pinion, a plurality of arms 6 adapted to engage the teeth of the wheel. Means are provided for enabling the axle of the pinion and wheel to be brought into alinement or eccentrically disposed with respect to each other, as hereinafter explained. The construction of the said arms 6 is such as to permit of their extending in their extreme outward position so as to engage the teeth of the wheel when the axles of the latter and that of the pinion are in alinement and to allow of such arms "nesting" or overlapping each other in order to reduce the radius of the engaging portions of such pinion as required when the axles are in eccentric relation. For this purpose the said arms are off-set from the face of the boss and each of such arms is backed-off or tapered toward one of its sides so as to produce an approximately triangular section at the point at which it overlaps its fellow when such arms are in the nested condition. To enable them to engage the teeth 3 of the gear-wheel, each of the said arms is formed in its outer end with a notch or groove 7, while to maintain such arms outward with their notches in engagement with the teeth of the wheel, suitable springs or other means 8 are provided.

Each of the arms 6 is pivoted upon the boss 5 by means of a pin 9 formed integral with such arm or rigidly secured thereto, the said pin being of sufficient length to pass through the two cheeks of the boss and to project for the required distance upon the opposite face of such boss. Upon the portions of the arms 6 extending upon the inner sides of the pivots are arranged weights 10 adapted to counterbalance the outer portions of such arms in order to reduce the tendency of such arms to fly outward in consequence of the centrifugal force occasioned by the rotation.

The balance weights 10 are arranged to enter between the cheeks of the boss and the inner edges of such weights are adapted to come in contact with the periphery of the core 11 of the boss and so form a stop to limit the outward movement of the arms. In order to reduce noise the contacting portion of the weights 10 or of the core 11 may be provided with a block or cushion of rubber, leather or other resilient material and similar cushions may be provided in the notches in the outer ends of the arms to silence their contact with the teeth of the gear wheel.

To limit the inward movement of the arms stops or pins 12 are provided at the required points upon the face of the boss. (See Fig. 4.)

In cases where the device is required to give a speed above that of the driving shaft, the latter is connected to the gear-wheel and the load to the pinion, the direction of rotation being that indicated by the arrow Fig. 3. While the centers of the wheel and pinion are in line with one another (as in Fig. 2) the speeds will be the same, but upon moving them into eccentric relation as shown in Fig. 3, the speed of the pinion will be greater than that of the gear-wheel, the ratio of the speeds varying according to the extent of the eccentricity of the two axles, or in other words to the difference in radius of the wheel and pinion as in an ordinary gear train.

In order to obtain speeds below that of the driving shaft, the latter is connected to the pinion and the wheel to the load, the direction of rotation being the reverse of that above described, in which case the speeds will be the same while the wheel and pinion are concentric with each other and the speed of the wheel less than that of the pinion as the two are brought into eccentric relation. In the latter case (that of a reduction gear) the arms, if allowed to project in their outward position due to centrifugal force or the tendence of the springs 8, would be liable to engage the teeth of the wheel prematurely and so interfere with the working of the device. In order to overcome this disadvantage, the extremities of the pins 9 are provided with pinions or segments of pinions 13 adapted to be engaged at the required position by one or a plurality of teeth 14 mounted upon the bearing of the pinion shaft or other convenient fixed point which will be at all times concentric with the axle of the pinion 4. By this arrangement as the pinion 4 rotates the teeth of each of the pinions 13 will in turn come into mesh with the teeth 14 which action will serve to carry the attached arms inward and maintain them in such position until such arms are in the correct place to engage the teeth of the wheel.

Referring to Fig. 7ᵃ the teeth 14 are carried upon some non-rotatable portion of the frame-work such as the bearing 25 for instance. Thus, as the boss 5 revolves in the direction indicated by the arrow, each of the pinions 13 will in turn, as each reaches a certain point in the revolution, be brought into mesh with such teeth 14 as shown. As the turning of the boss 5 continues this engagement or inter-meshing of the pinion 13 with the fixed or stationary teeth 14 will result in turning the arm into the "nested" position shown in dotted lines.

As an alternative for that above described, the ends of the pins 9 may be provided with disks or quadrants 15 having a concentric arrangement of pins or teeth 16. At the required points upon the face of the boss are arranged levers 17 (one for each of the quadrants), such levers being fulcrumed at one end as at 18 and formed at their intermediate portion with teeth 19 adapted to intermesh with the teeth of the quadrants and turn the arms into the required position when the free end of the lever is pressed inward toward the center of the boss. To effect this object a cam or projection is provided upon the bearing of the pinion shaft or other suitable fixed point so as to come in contact with and operate each of the levers in turn at the required position.

Referring to Fig. 8ᵃ similar pinions may be arranged upon each of the arm spindles 9 or as an alternative, their place may be occupied by quadrants 15 as shown, and provided with a series of pins or projections 16. At the required points upon the boss 5 are arranged levers 17 (one for each quadrant) fulcrumed at 18 and having teeth 19, adapted, when such lever is turned upon its pivot, to engage with the pins 16 (or the teeth of the pinion if such is employed) and so cause the arm to turn into the desired position as indicated in dotted lines. To effect this turning of the lever a pin stop $k$ is arranged at the required position upon some fixed point, as the bearing 25 for instance, against which pin $k$ the outer or free end of each lever will engage or trip as each lever reaches the required point in the revolution of the boss.

In practice the construction of the device as a whole may conveniently be duplicated so that the pinion of the one set and the wheel of the other set may be mounted upon an intermediate shaft 20 carried upon adjustable bearings 21 which are adapted to be rocked upon a pivot 22 so as to permit of the required eccentric movement with respect to the shafts 2 and 23 at either end which latter are mounted in fixed bearings 24 and 25 and upon which shafts are carried respectively the wheel for the one set and the pinion of the other set.

I claim—

1. A device of the class described comprising in combination an internal gear wheel constituted by a disk having concentrically disposed upon one of its side faces a series of equidistantly disposed projections, and a pinion of variable radius adapted to co-act therewith and comprising a boss around which are pivoted a plurality of tangentially disposed arms the ends of which are adapted to engage with the teeth of the wheel each of said arms being off-set from the face of the boss and formed at its intermediate portion of approximately triangular section so as to permit of such arms overlapping one another, substantially as and for the purpose set forth.

2. In a device of the class described the combination with an internal gear wheel, of a pinion of variable radius and adapted to co-act therewith and comprising a boss around which are pivoted a plurality of tangentially disposed arms the ends of which are adapted to engage the teeth of the said wheel, each of the said arms being off-set from the face of the boss and formed at its intermediate portion of approximately triangular section so as to permit of such arms overlapping one another, substantially as and for the purpose set forth.

3. A device of the class described comprising in combination an internal gear-wheel and a pinion of variable radius adapted to co-act therewith and comprising a boss around which are pivoted a plurality of tangentially disposed arms the ends of which are adapted to engage the teeth of the said wheel, a weight carried upon the inner end of each of the said arms adapted to balance the portion of such arm extending upon the other side of the pivot and suitable cushioning means introduced between such weight and the contacting portion of the core of the boss, substantially as and for the purpose set forth.

4. A device of the class described comprising in combination an internal gear wheel and a pinion of variable radius adapted to co-act therewith comprising a boss around which are pivoted a plurality of tangentially disposed arms the ends of which are adapted to engage the teeth of the wheel, and cushioning means provided upon the portions of the arms which engage the teeth of the wheel, substantially as and for the purpose set forth.

5. A reduction gear of the class described comprising the combination with an internal gear wheel, of a pinion of variable radius and adapted to co-act therewith comprising a boss around which are pivoted a plurality of tangentially disposed arms the ends of which are adapted to engage the teeth of the said wheel and means provided upon the pivots of each of the said arms and adapted to be engaged by projections arranged upon the bearing of the pinion-shaft or other convenient fixed point at all times concentric therewith so as to turn the arms into such a position as to prevent their ends engaging prematurely with the teeth of the wheel, substantially as and for the purpose set forth.

In testimony whereof I have signed my name to this specification in the presence of two subscribing witnesses.

THOMAS FOSTER.

Witnesses:
    PERCY RICHMOND CLIMIE,
    CYRIL CARLYON COATES.